(12) United States Patent
Ramakrishnan et al.

(10) Patent No.: US 10,452,211 B2
(45) Date of Patent: Oct. 22, 2019

(54) FORCE SENSOR WITH UNIFORM RESPONSE IN AN AXIS

(71) Applicant: Synaptics Incorporated, San Jose, CA (US)

(72) Inventors: Shubha Ramakrishnan, San Jose, CA (US); Adam Schwartz, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 199 days.

(21) Appl. No.: 15/397,534

(22) Filed: Jan. 3, 2017

(65) Prior Publication Data

US 2017/0344149 A1 Nov. 30, 2017

Related U.S. Application Data

(60) Provisional application No. 62/342,837, filed on May 27, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04105* (2013.01)

(58) Field of Classification Search
CPC ................... G06F 3/044; G06F 3/0412; G06F 2203/04105
See application file for complete search history.

(56) References Cited

U.S. PATENT DOCUMENTS

| | | | |
|---|---|---|---|
| 5,510,813 | A | 4/1996 | Makinwa et al. |
| 5,854,625 | A | 12/1998 | Frisch et al. |
| 5,942,733 | A | 8/1999 | Allen et al. |
| 5,973,668 | A | 10/1999 | Watanabe |
| 6,002,389 | A | 12/1999 | Kasser |
| 6,888,537 | B2 | 5/2005 | Benson et al. |
| 6,958,614 | B2 | 10/2005 | Morimoto |
| 7,047,818 | B2 | 5/2006 | Dallenbach et al. |
| 7,148,882 | B2 | 12/2006 | Kamrath et al. |
| 7,196,694 | B2 | 3/2007 | Roberts |
| 7,398,587 | B2 | 7/2008 | Morimoto |
| 7,451,659 | B2 | 11/2008 | Dallenbach et al. |
| 7,499,040 | B2 | 3/2009 | Zadesky et al. |
| 7,656,465 | B2 | 2/2010 | Takeda et al. |
| 7,728,487 | B2 | 6/2010 | Adachi et al. |
| 7,743,667 | B2 | 6/2010 | Harish et al. |
| 7,784,366 | B2 | 8/2010 | Daverman et al. |

(Continued)

FOREIGN PATENT DOCUMENTS

| | | |
|---|---|---|
| EP | 0467562 A2 | 1/1992 |
| EP | 2629075 A1 | 8/2013 |

(Continued)

*Primary Examiner* — Andrew Sasinowski
(74) *Attorney, Agent, or Firm* — Ferguson Braswell Fraser Kubasta PC

(57) ABSTRACT

An input device includes an input surface having a first axis and a second axis, and force sensor electrodes. The force sensor electrodes have a cumulative capacitive sensor response to a force on the input surface. The cumulative capacitive sensor response is, within a specified tolerance, uniform along the first axis based on the plurality of sizes of the plurality of force sensor electrodes.

18 Claims, 10 Drawing Sheets

(56) References Cited

U.S. PATENT DOCUMENTS

| | | |
|---|---|---|
| 7,903,091 B2 | 3/2011 | Lee et al. |
| 8,120,229 B2 | 2/2012 | Huang |
| 8,169,416 B2 | 5/2012 | Han |
| 8,698,769 B2 | 4/2014 | Coulson et al. |
| 9,024,907 B2 | 5/2015 | Bolender |
| 2002/0180710 A1 | 12/2002 | Roberts |
| 2003/0151589 A1 | 8/2003 | Bensen et al. |
| 2004/0112149 A1 | 6/2004 | Gebert |
| 2004/0155991 A1 | 8/2004 | Lowles et al. |
| 2004/0227736 A1 | 11/2004 | Kamrath et al. |
| 2005/0052425 A1 | 3/2005 | Zadesky et al. |
| 2005/0057266 A1 | 3/2005 | Morimoto |
| 2005/0057528 A1 | 3/2005 | Kleen |
| 2005/0061082 A1 | 3/2005 | Dallenbach et al. |
| 2006/0017701 A1 | 1/2006 | Marten et al. |
| 2006/0197753 A1 | 9/2006 | Hotelling |
| 2007/0063982 A1 | 3/2007 | Tran |
| 2007/0229464 A1 | 10/2007 | Hotelling et al. |
| 2007/0229470 A1 | 10/2007 | Snyder et al. |
| 2007/0236450 A1 | 10/2007 | Colgate et al. |
| 2007/0257821 A1 | 11/2007 | Son et al. |
| 2007/0268265 A1 | 11/2007 | XiaoPing |
| 2008/0018608 A1 | 1/2008 | Serban et al. |
| 2008/0018611 A1 | 1/2008 | Serban et al. |
| 2008/0062148 A1 | 3/2008 | Hotelling et al. |
| 2008/0068348 A1 | 3/2008 | Rosenberg et al. |
| 2008/0142352 A1 | 6/2008 | Wright |
| 2008/0190210 A1 | 8/2008 | Harish et al. |
| 2008/0202251 A1 | 8/2008 | Serban et al. |
| 2008/0202824 A1 | 8/2008 | Philipp et al. |
| 2009/0002328 A1 | 1/2009 | Ullrich et al. |
| 2009/0160682 A1 | 6/2009 | Bolender et al. |
| 2009/0160763 A1 | 6/2009 | Cauwels et al. |
| 2009/0167704 A1 | 7/2009 | Terlizzi et al. |
| 2009/0243817 A1 | 10/2009 | Son |
| 2010/0024573 A1 | 2/2010 | Daverman et al. |
| 2010/0026664 A1 | 2/2010 | Geaghan |
| 2010/0033354 A1 | 2/2010 | Ejlersen |
| 2010/0079384 A1 | 4/2010 | Grivna |
| 2010/0090813 A1 | 4/2010 | Je et al. |
| 2010/0107770 A1 | 5/2010 | Serban et al. |
| 2010/0108409 A1 | 5/2010 | Tanaka et al. |
| 2010/0149128 A1 | 6/2010 | No et al. |
| 2010/0156814 A1 | 6/2010 | Weber et al. |
| 2010/0250071 A1 | 9/2010 | Pala et al. |
| 2011/0005845 A1 | 1/2011 | Klotelling et al. |
| 2011/0025631 A1 | 2/2011 | Han |
| 2011/0148811 A1 | 6/2011 | Kanehira et al. |
| 2011/0175844 A1 | 7/2011 | Berggren |
| 2011/0278078 A1 | 11/2011 | Schediwy et al. |
| 2012/0075243 A1 | 3/2012 | Doi et al. |
| 2012/0090902 A1 | 4/2012 | Liu et al. |
| 2012/0098783 A1 | 4/2012 | Badaye et al. |
| 2012/0105333 A1 | 5/2012 | Maschmeyer et al. |
| 2012/0242610 A1 | 9/2012 | Yasumatsu |
| 2013/0234968 A1 | 9/2013 | Yanagi et al. |
| 2015/0169091 A1* | 6/2015 | Ho ................ G06F 3/0416 345/173 |
| 2015/0227230 A1* | 8/2015 | Cok ................ G06F 3/044 345/174 |
| 2016/0005352 A1* | 1/2016 | Kim ................ G06F 3/044 345/212 |

FOREIGN PATENT DOCUMENTS

| | | |
|---|---|---|
| WO | 9718528 A1 | 5/1997 |
| WO | 0235461 A1 | 5/2002 |
| WO | 2005121729 A1 | 12/2005 |
| WO | 2007098171 A2 | 8/2007 |
| WO | 2009157614 A1 | 12/2009 |
| WO | 2010018889 A1 | 2/2010 |
| WO | 2011156447 A1 | 12/2011 |
| WO | 2013177322 A1 | 11/2013 |
| WO | 2015106183 A1 | 7/2015 |

* cited by examiner

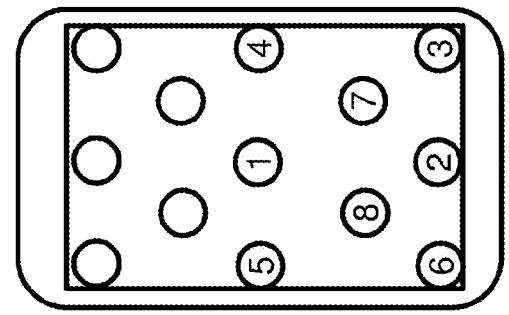
*FIG. 3.2*
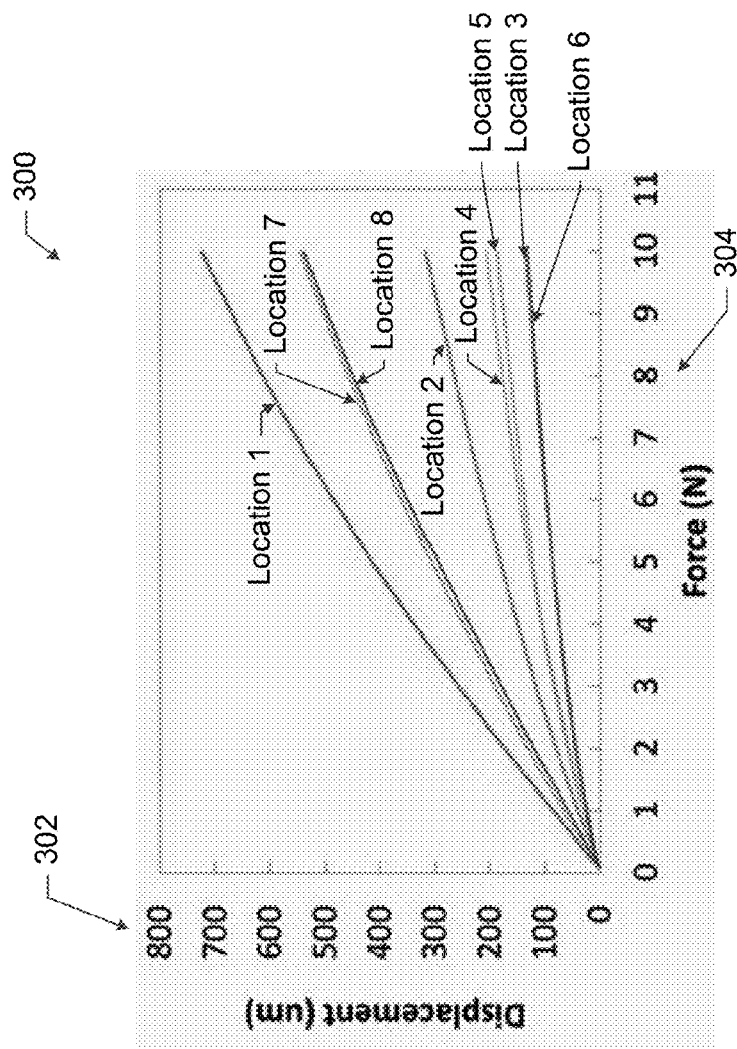
*FIG. 3.1*

FORCE SENSOR WITH UNIFORM RESPONSE IN AN AXIS

CROSS-REFERENCE TO RELATED APPLICATIONS

This application claims priority under 35 U.S.C. § 119(e) to U.S. Provisional Patent Application Ser. No. 62/342,837, filed on May 27, 2016 and entitled, "FORCE SENSOR WITH UNIFORM RESPONSE IN AN AXIS", which is incorporated herein by reference in its entirety.

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to an input device that includes an input surface having a first axis and a second axis, and force sensor electrodes. The force sensor electrodes have a cumulative capacitive sensor response to a force on the input surface. The cumulative capacitive sensor response is, within a specified tolerance, uniform along the first axis based on the plurality of sizes of the plurality of force sensor electrodes.

In general, in one aspect, one or more embodiments relate to an input device that includes an input surface having a first axis, a second axis substantially orthogonal to the first axis, and a corner. The input device further includes force sensor electrodes including a first sensor electrode adjacent to the corner, and a second sensor electrode. The second sensor electrode is located farther from the corner along the first axis than the first sensor electrode, and is smaller than the first sensor electrode.

In general, in one aspect, one or more embodiments relate to a processing system for an input device, the processing system includes sensor circuitry configured to be coupled to positional sensor electrodes, and force sensor electrodes. The sensor circuitry is configured to obtain force measurements from the force sensor electrodes, and obtain positional measurements from positional sensor electrodes. The force sensor electrodes has a cumulative capacitive sensor response that is substantially uniform along a uniform axis of the input surface. The processing system further includes processing circuitry configured to determine, using the force measurements, a cumulative capacitive sensor response, and determine, using the cumulative capacitive sensor response, force information.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

FIGS. 3.1 and 3.2 show an example of a bending response in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, when force is applied to a position of an input surface, the amount of bending of the input surface may vary at different positions of the input surface. Further, equal amounts of force applied at different positions and at separate times may exhibit different bending properties depending on the position of the input surface in which the force is applied. The capacitive measurements acquired from capacitive force sensor electrodes are dependent on the bending of the input surface. Thus, irregular bending properties of the input surface are accounted for in order to determine the amount of force applied.

One or more embodiments are directed to varying sizes of force sensor electrodes to create cumulative capacitive sensor response that is uniform along an axis. In other words, the combination of capacitive force measurements is independent of the position, with respect to at least one axis, of the force that is applied to the input surface.

Figure 1:
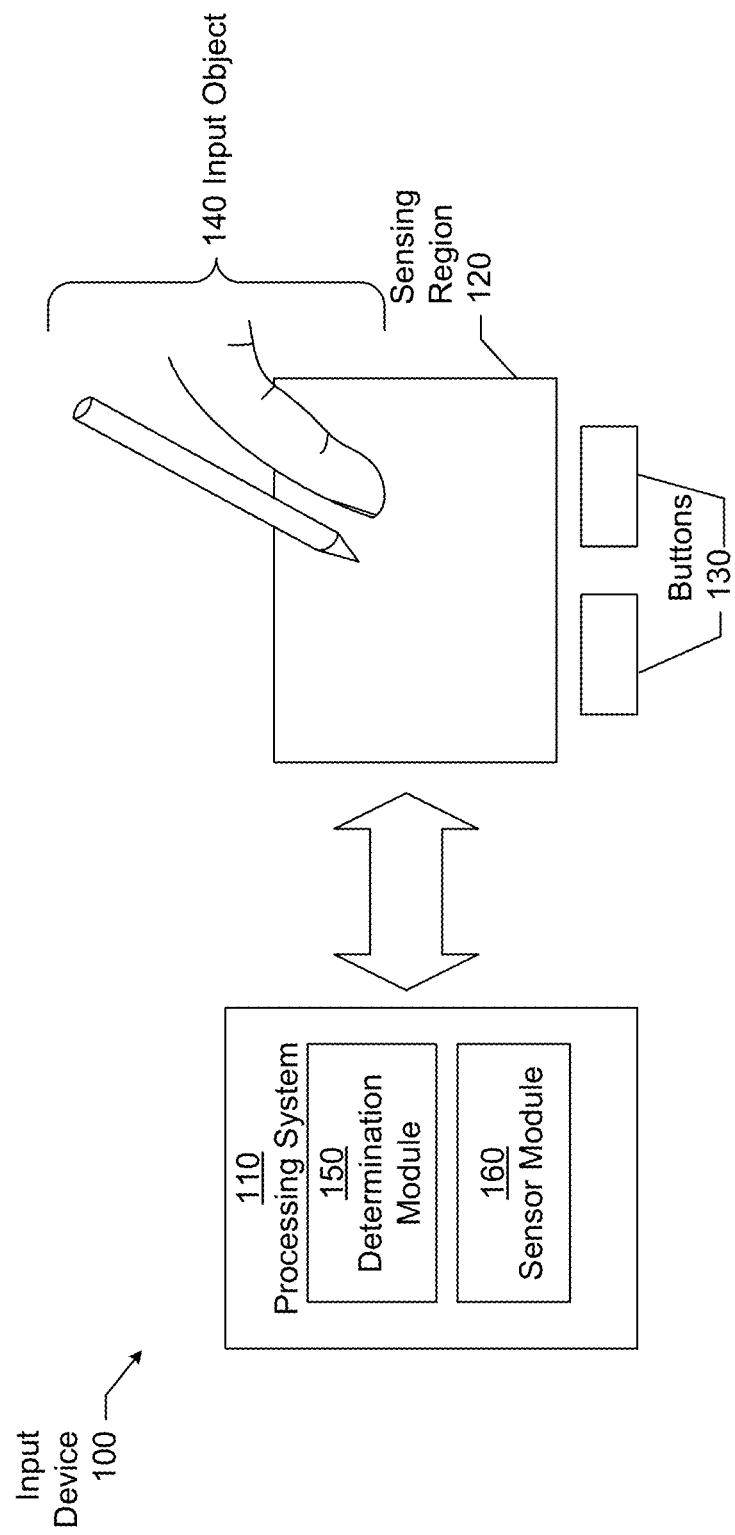
FIGS. 1 and 2 are block diagrams of an example system that includes an input device in accordance with an embodiment of the invention.

Turning now to the figures, FIG. 1 is a block diagram of an exemplary input device (100) in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from an input surface of the input device (100) in one or more directions into space until signal-to-noise ratios prevent sufficiently accurate object detection. In other words, the input surface is the physical plane that may be physically contacted by an input object. The extension above the input surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage. In various embodiments, the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage. In various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in whole by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
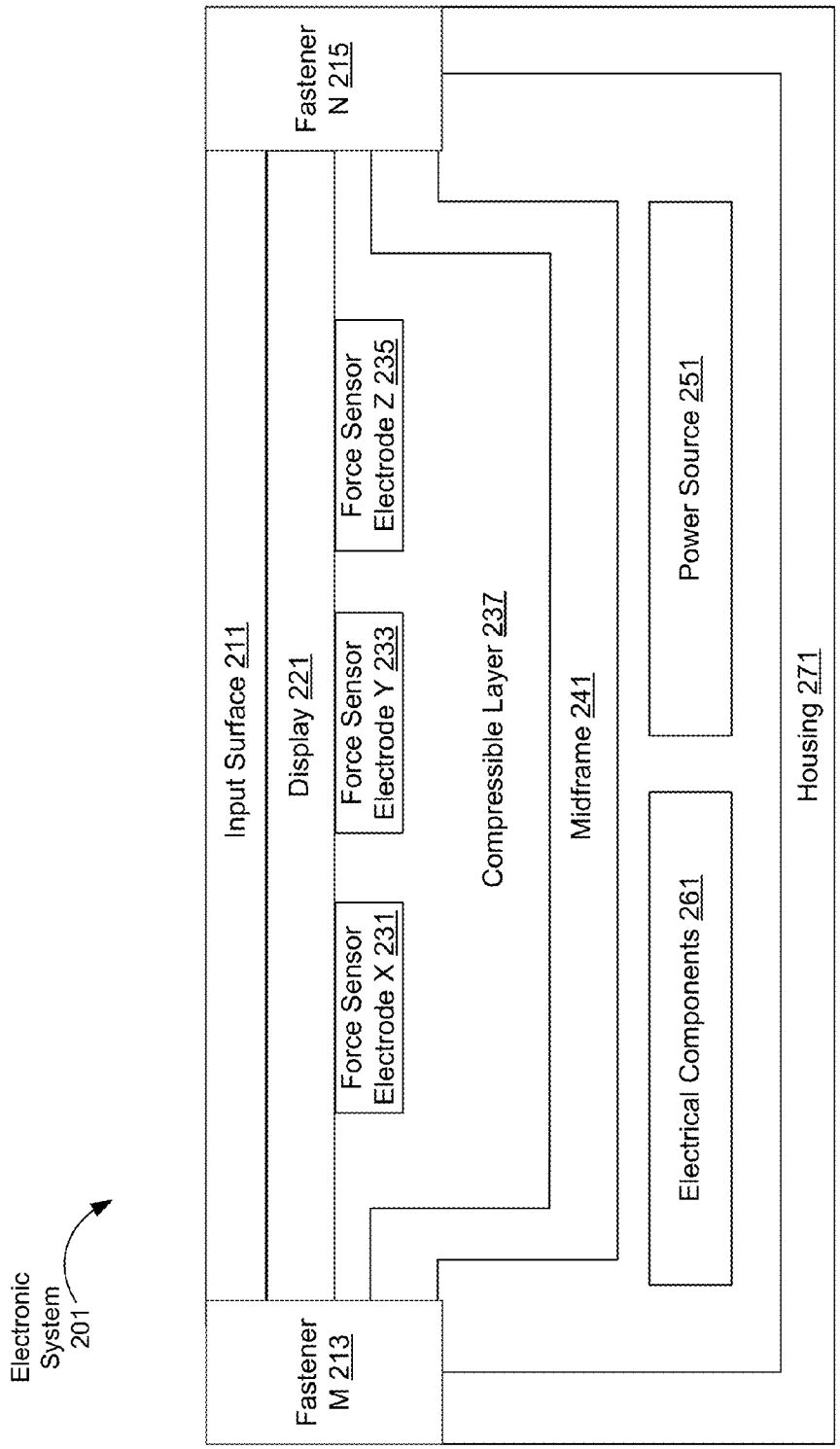

Turning to FIG. 2, FIG. 2 shows an example cross sectional diagram of an electronic system (201) in accordance with one or more embodiments. The electronic system (201) may be a smart phone, a tablet computing device, a touchscreen, a computing device with a touchpad, or other device. As shown in FIG. 2, an electronic system (201) may include an input surface (211), display (221), force sensor electrodes (e.g., force sensor X (231), force sensor electrode Y (233), force sensor electrode Z (235)), a compressible layer (237), midframe (241), power source (251), electrical components (261), and housing (271). Each of these components is described below.

The housing (271) may be metal, plastic, other material, or a combination of materials. The housing (271) may be referred to as the frame of the electronic system (201) and may hold the input device.

The input device may include the input surface (211), display (221), and the compressible layer (237) as well as various components described above with reference to FIG. 1. The compressible layer may consist of air, a compressible material such as foam or a combination of air and compressible materials. The input surface (211) is the surface of the input device that may be touched by an input object. For example, the input surface (211) may be glass or other material. The display (221) is a physical device that is configured to present visual information to a user. For example, the display (221) may be any type of light emitting diode (LED), organic LED (OLED), liquid crystal display (LCD), plasma, electroluminescence (EL), or other display technology. The input surface (211) and display (221) have bending properties that define the amount of bending by the input surface (211) and display (221) in response to force at various positions along the input surface. In other words, the bending properties of the input surface (211) and display (221) refer to the amount of bend (i.e., deflection) of the input surface (211) and display (221) when subjected to an external force onto the input surface (211) and display (221). The input surface (211) and display (221) may be treated as having single bending properties or individual bending properties. Although FIG. 2 shows a distinct input surface (211) and display (221), the input surface may be an uppermost part of the display.

One or more fasteners (e.g., fastener M (213), fastener Y (215)) may connect the input surface (211) and the display (221) to the housing (271) at attachment points. The fasteners may hold the display structure to the midframe. The display structure includes the input surface (e.g., cover glass or other material) which is attached to the display by a layer of optically clear adhesive. The fastener may be an adhesive (e.g., weld, solder, cement, glue), crimping, a mounting bracket or other hardware connector, or other type of fastener. The attachment points are the points at which the fastener connects the input surface (211) and display (221) to the housing (271). For example, the attachment points may be around the edges of the display structure. Other attachment points may exist without departing from the scope of the invention. Amongst other factors, such as punch outs in the midframe (241), the fastener and locations of attachment points may affect the bending properties of the of the input surface (211) and display (221). In other words, the amount of bend may change depending on the type of fastener used and the location of the attachment points.

The electronic system (201) may further include various electrical components (261), and a power source (251). The electrical components (261) may include one or more circuit boards, such as a main board or printed circuit board assembly, that have various integrated circuits attached to the circuit boards. In another example, the electrical components (261) may include a processor, memory, and/or any other electrical devices for operating the electronic system (201).

Furthermore, the power source (251) may be hardware that includes functionality to provide electrical power to the electrical components (261), the force sensor electrodes (e.g., force sensor X (231), force sensor electrode Y (233), force sensor electrode Z (235)), and a processing system (not shown). For example, the power source (251) may be a rechargeable battery with functionality to charge using an electric current obtained from an external power source connected to the electronic system (201).

In one or more embodiments, the electronic system (201) includes a midframe (241) disposed between the display (221) and the housing (271). For example, the midframe (241) may be a conductive material configured as an interior support frame, for example, for the electronic system (201). Moreover, the midframe (241) may be a piece of sheet metal, such as a shielding can. In one or more embodiments, for example, the midframe (241) is a foil or plating layer attached to a non-conductive substrate. The midframe (241) may include various punch outs or cutouts for electrical and/or optical connectors that may affect the bending properties.

The force sensor electrodes (e.g., force sensor X (231), force sensor electrode Y (233), force sensor electrode Z (235)) are sensor electrodes that are arranged so as to be electrically affected by a force applied to the input surface. Thus, measurements acquired using the force sensor electrodes indicate the amount of force applied to the input surface. Various different arrangements of force sensor electrodes may be used without departing from the scope of the invention. The following are a few example arrangements.

In particular, FIG. 2 shows an example in which the force sensor electrodes are attached or a part of the display. In such a scenario, absolute capacitive sensing may be used. In particular, when force is applied to the input surface, the compressible layer compresses causing the midframe to be closer to the force sensor electrodes. Based on the decrease in distance (i.e., the amount of bend or deflection), the absolute capacitance of a force sensor electrode changes, whereby the amount of change reflects the amount of the decrease and correspondingly the amount of force applied. In another embodiment of the configuration of FIG. 2, transcapacitive sensing may be used. In such a scenario, a first subset of the force sensor electrodes adjacent to the display may be transmitter electrodes and a second subset of force sensor electrodes adjacent to the display may be receiver electrodes. The transmitter electrodes may transmit transmission signals and the receiver electrodes may receive resulting signals from the transmission signals. When a force is applied to the input surface, the compressible layer compresses causing the midframe to be closer to the transmitter electrodes and receiver electrodes. The reduction of distance to the midframe changes the resulting signals received by the receiver electrodes as compared to the electronic system without force applied. Thus, the measurements of the resulting signals are affected by the amount of force applied.

By way of another configuration (not shown), a first subset of the force sensor electrodes may be located above the compressible layer and a second subset of the force sensor electrodes may be located below the compressible layer. Further, the midframe may or may not include conductive material. In the example, capacitive sensing between the first subset and second subset may be performed as described above to determine the amount of deflection, and correspondingly indicate the amount of force of the first subset to the second subset.

In another example, one or more of the force sensor electrodes (231, 233, 235) may be electrodes of the display (221) used for both display updating and force and/or touch sensing. In other words, some or all of the electrodes used to update the display may be used to perform capacitive sensing. The capacitive sensing may be for force (e.g., based on capacitance being affected by an amount of compression of the compressible layer) and/or for touch (e.g., based on capacitance being affected by a position of an input object in the sensing region) to determine positional information.

The above are only a few examples. Other configurations of the electronic system to perform force sensing may be used without departing from the scope of the invention.

Turning to FIGS. 3.1 and 3.2, FIG. 3.1 shows a portion of a bending model (300) for the bend caused by an input force at various locations of an input surface. The associated bending model has a Y-axis (302) showing displacement level and an X-axis (304) defining an amount of force for each different location. For simplicity, the displacement shown in the bending model is a cumulative displacement across the input surface. In other words, the graph (300) does not show the individual displacements at the various positions. Thus, the graph (300) shows cumulative capacitive sensor response $\Sigma_i \Delta C_i$ of an input device versus applied force and applied position. In particular, the graph (300) illustrates various response curves as a function of a magnitude of an input force applied to an input surface. Often, the location of the maximum deflection is not co-located with the location of the applied input force as a result of the physical properties of the input device.

Each displacement curve in FIG. 3.1 corresponds to a particular location of an input surface as shown in FIG. 3.2. For example, location 1 shown in the center of the input surface in FIG. 3.2 may produce the maximum amount of displacement according to the graph in FIG. 3.1 for an increasing force applied at each location. Generating a force vs. displacement curve for various location on an input surface is one method for determining the bending model of an input device, and sizing the sensor electrodes accordingly. As shown, the cumulative capacitive sensor response to a specified amount of force is largely dependent on the location in which the force is applied. For example, the cumulative capacitive sensor response for a force of 5 Newtons (N) is approximately 400 micrometers (um) at location 1 whereas the same force is approximately 300 um at location 8 and 100 um at location 6. Thus, determining an amount of force is dependent on the location in which the force is applied by an input object. Specifically, in such a scenario, to determine the amount of force, the location of the input object with respect to both axes is determined from touch information and used to obtain a corresponding bending model that is specific to that location. The bending model and the values from the force sensors are used to determine the amount of force applied.

However, one or more embodiments vary the size of the sensor electrodes along at least one axis to make the cumulative capacitive sensor response uniform within a specified tolerance. Thus, by varying the sizes of the sensor electrodes with respect to each other at least on one axis, one or more embodiments mitigate or remove the dependency of location along the axis to determine the amount of force applied. By removing the dependency of location, fewer bending models need to be created and stored in memory and fewer processing cycles are used than when the dependency exists.

Figure 4:
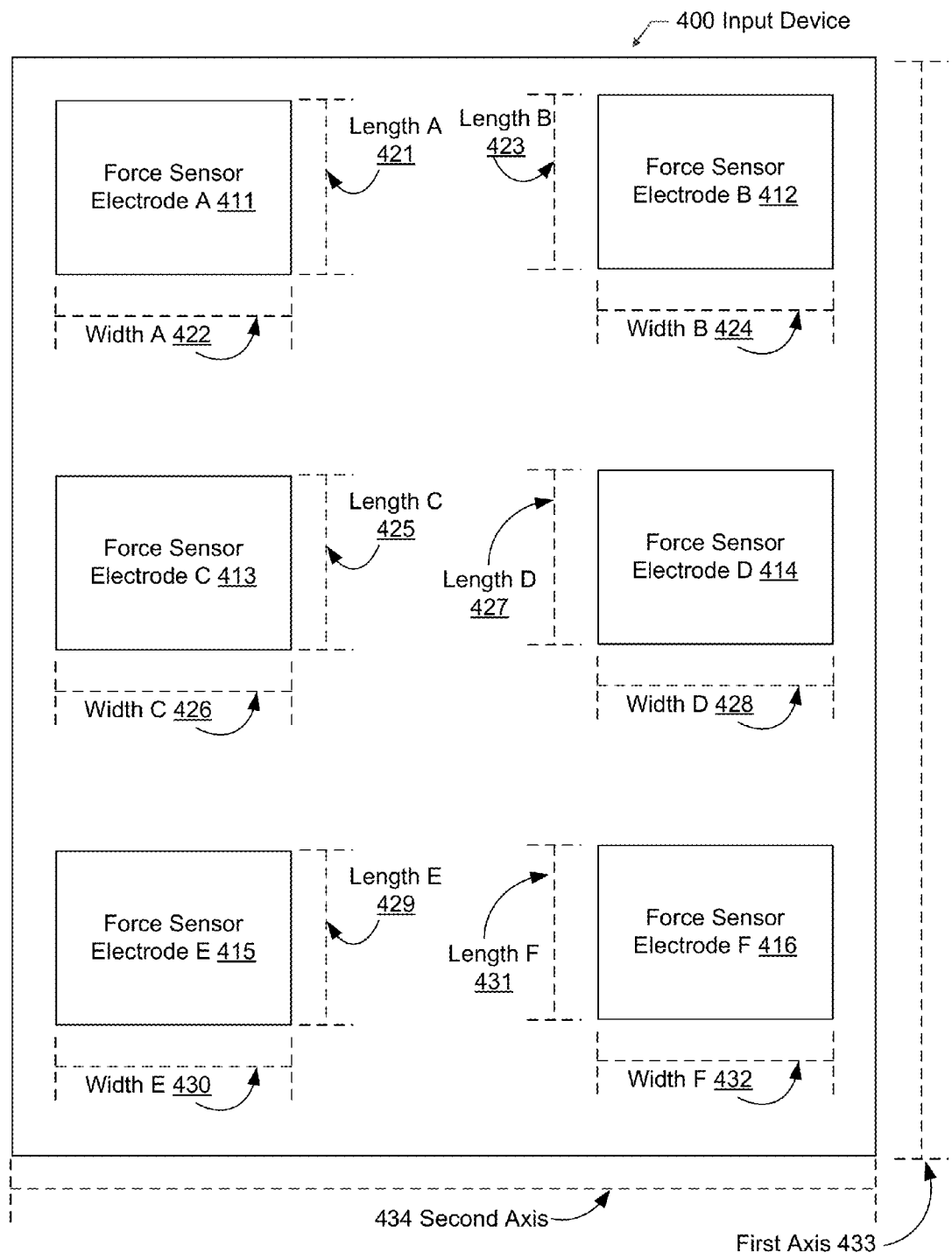
FIGS. 4, 5, and 6 show example layouts of force sensor electrodes in accordance with one or more embodiments of the invention.

FIG. 4 shows an example diagram of top down perspective a force sensor layout on an input device in accordance with one or more embodiments of the invention. The following example is for illustrative purposes only and not intended to limit the scope of the invention. For example, more or fewer force sensor electrodes may exist without departing from the scope of the invention.

As shown in FIG. 4, the input device (400) includes a first axis (433) and a second axis (434). The first axis (433) is orthogonal to the second axis (434). The first axis (433) and the second axis (434) are axes of the input surface. In other words, the first axis (433) and the second axis (434) are parallel to the plane of the input surface. As used herein, orthogonal includes substantially orthogonal as desired by design choice and manufacturing tolerances. Further, although FIG. 4 shows the first axis (433) as being longer than the second axis (434), the first axis (433) may be the same size as or shorter than the second axis (434).

The input device (400) is shown with various force sensor electrodes (e.g., force sensor electrode A (411), force sensor electrode B (412), force sensor electrode C (413), force sensor electrode D (414), force sensor electrode E (415), and force sensor electrode F (416)). As shown, each force sensor electrode (411, 412, 413, 414, 415, 416) includes sensor dimensions (e.g., length A (421), width A (422), length B (423), width B (424), length C (425), width C (426), length D (427), width D (428), length E (429), width E (430), length F (431), and width F (432)) with respect to length and width of each of the force sensor electrodes. The force sensor dimensions of the force sensor electrodes (411, 412, 413, 414, 415, 416) produce a particular cumulative capacitive sensor response of the input device (400). Although FIG. 4 shows rectangular force sensor electrodes, the force sensor electrodes may be virtually any shape, and, rather than length and width, more generally the electrode area can be adjusted.

Some of the force sensor electrodes have smaller dimensions than other force sensor electrodes. For example, the size of force sensor electrodes C and D (413 and 414) may be reduced as compared to force sensor electrodes A, B, E, and F (411, 412, 415, and 416). In other words, in the example rectangular force sensor electrodes of FIG. 4, the length and/or width of force sensor electrodes C and D (413) may be less than the length and/or width of force sensor electrodes A, B, E, and F (411, 412, 415, and 416). By decreasing the size of the force sensor electrodes, the capacitive sensor response is reduced at the electrodes as compared to the amount of deflection at the electrodes. In particular, the smaller dimensions provide a cross sectional area of the force sensor electrode that is reduced. Thus, the surface area of the force sensor electrode exposed to another electrode (e.g., transmitter electrode or receiver electrode) in the case of mutual capacitive sensing, and/or exposed to the midframe in the case of absolute capacitive sensing varies between force sensor electrodes. In other words, for an equal amount of deflection at the location of the electrodes (e.g., compression of the compressible material), the smaller force sensor electrodes have a lower capacitive sensor response than the larger electrodes. However, because the bending response is unequal at different locations for the same amount of force, varying the sizes of the force sensor electrodes are configured provide a uniform cumulative capacitive sensor response along at least one axis (e.g., first axis (433), second axis (434)). As will be seen in FIG. 7, the cumulative capacitive sensor response is substantially uniform along one axis (the X-axis 720 of FIG. 7). Although not shown or described above, the depth dimension (e.g., dimension perpendicular to the first and second axis) of one or more of the force sensor electrodes may or may not additionally vary between force sensor electrodes.

In various embodiments, the input device measures capacitance changes due to deflection. The change in capacitance $\Delta C_i(x,y)$ from a force applied at (x,y) may be approximated by the following equation (Eq. 1).

$$\Delta C_i(x, y) = \frac{a_i \epsilon}{(d_i - \Delta d_i(x, y))} - \frac{a_i \epsilon}{d_i} \qquad \text{Eq. 1}$$

where $a_i$ is the area of electrode i, $d_i$ is the nominal distance between force sensor electrode i and a reference voltage substrate when no force is applied, $\Delta d_i(x,y)$ is the deflection of force sensor electrode i, and E is the permittivity value of the material separating the electrode from the reference voltage substrate. $\Delta C_i(x,y)$, or the change in capacitance, may be considered the force measurement. From Equation 1, the deflection can be determined using the following equation (Eq. 2).

$$\frac{\Delta d_i}{d_i} = \frac{\Delta C_i}{C_i + \Delta C_i} \qquad \text{Eq. 2}$$

Because force is proportional to displacement (for linear compressible materials in the gap), the applied force may be estimated as the cumulative capacitive sensor response F(x,y) using the following equation (Eq. 3).

$$F(x, y) = \sum_i w_i \frac{\Delta C_i}{C_i + \Delta C_i} \qquad \text{Eq. 3}$$

Using Equation 3, the cumulative capacitive sensor response F(x,y), is a weighted sum of estimates of the deflection at the location of each electrode. The cumulative capacitive sensor response F(x,y) may also be referred to as the cumulative force measurement. As shown, the cumulative capacitive sensor response is a weighted sum of a normalized force measurement. An example of a choice for the weights is $$w_i = \frac{1}{C_i}.$$

By way of another example, when the nominal distances $d_i$ are known, the weights $w_i$ may be set equal to $d_i$. By way of another example, the weights $w_i$ may be set equal to 1. In one or more embodiments, as shown by Equations 1 through 3, a desired cumulative capacitive sensor response is obtained when the nominal distance between the force sensor electrodes and a reference voltage substrate and/or the values of the area of a particular force sensor electrodes are adjusted, and thereby change the values of the cumulative capacitive sensor response. Other ways similar to Equation 3 for normalizing the response are possible.

Figure 5:
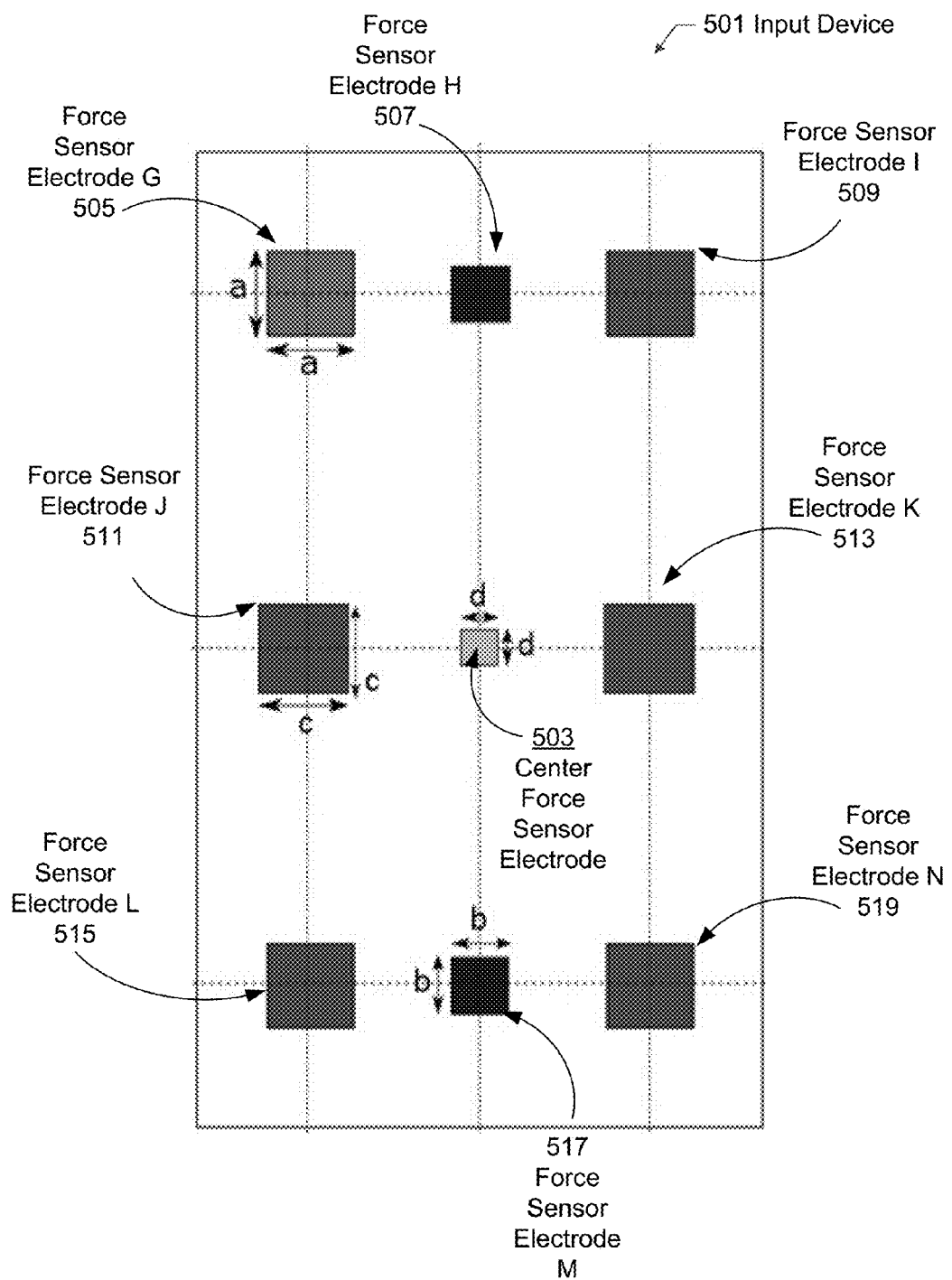

FIG. 5 shows an input device (501) with a center force sensor electrode (503) surrounded by various other force sensor electrodes (e.g., force sensor electrode G (505), force sensor electrode H (507), force sensor electrode I (509), force sensor electrode J (511), force sensor electrode K (513), force sensor electrode L (515), force sensor electrode M (517), force sensor electrode N (519)). In FIG. 5, d is less than b, b is less than c, and c is less than a. For the purposes of the example of FIG. 5 only, the dimensions of the force sensor electrodes are to scale with respect to each other. As shown, the center force sensor electrode (503) has a length and width according to a dimension d. With the center force sensor electrode (503) being in the region of the input device (501) with the greatest amount of deflection for an equal amount of force, the center force sensor electrode (503) may be the smallest electrode among the other force sensor electrodes (505, 507, 509, 511, 513, 515, 517, 519). In other words, the smaller size of the center force sensor electrode reduces the capacitive sensor response of the center force sensor electrode (503) as compared to the surrounding force sensor electrodes. Similarly, because of the respective amounts of bending responses to equal amounts of force, force sensor electrode M (517) has smaller dimensions than force sensor electrode L (515) and force sensor electrode N (519).

As discussed above, FIG. 5 is for illustrative purposes only. For input devices having different bending models, the relative sizes of the force sensor electrodes may be different than those shown without departing from the scope of the invention.

Figure 6:
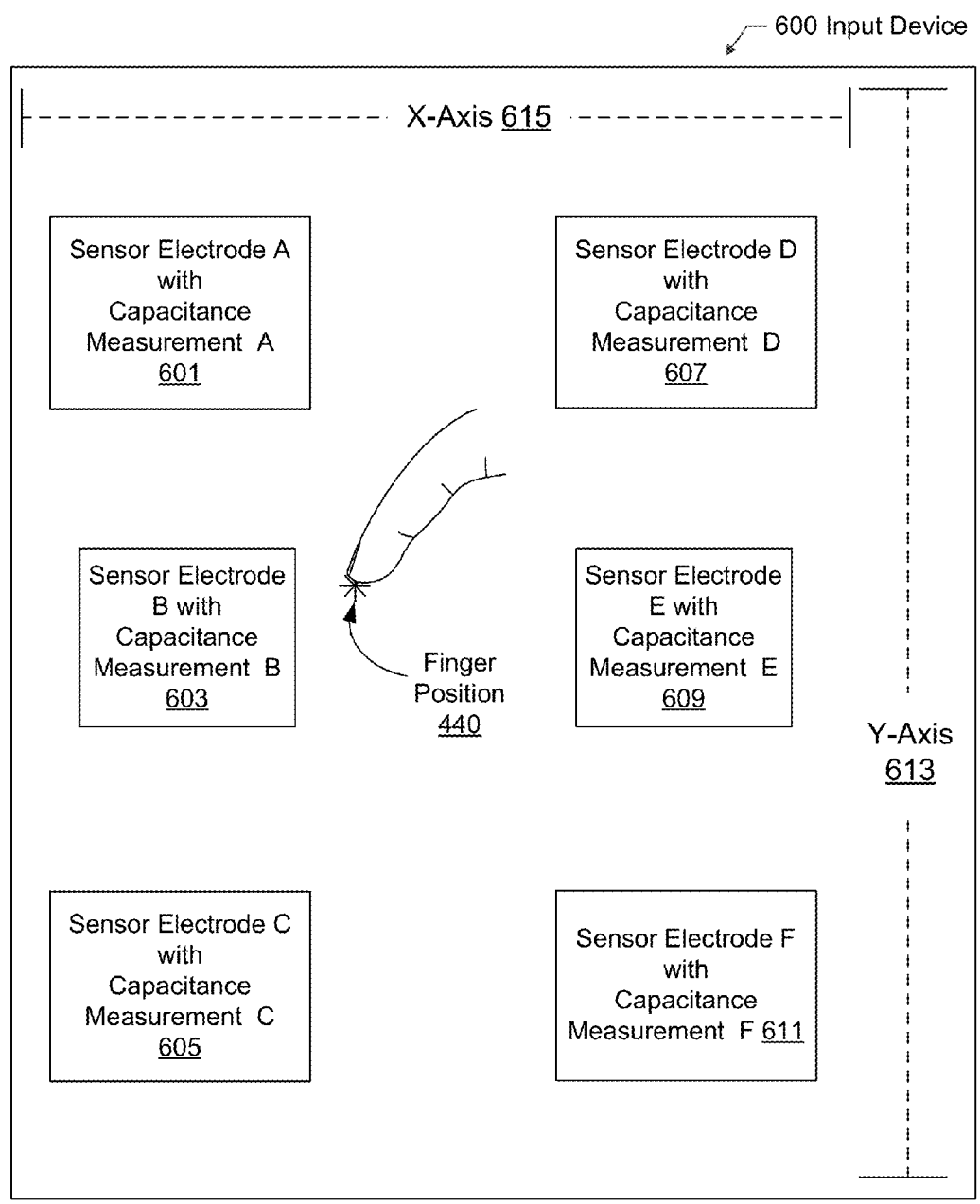

FIG. 6 shows an example diagram of an input device in accordance with one or more embodiments of the invention. In the example, the input device (600) includes six force sensor electrodes (e.g., force sensor electrode A (601), force sensor electrode B (603), force sensor electrode C (605), force sensor electrode D (607), force sensor electrode E (609), force sensor electrode F (611)). The force sensor electrodes are sized such that force sensor electrodes B (603) and E (609) are smaller than force sensor electrodes A (601), D (607), C (605) and F (611).

As shown in FIG. 6, when a finger applies force at finger position (440), various capacitance measurements (e.g., capacitance measurements A, B, C, D, E, F) are obtained from the respective force sensor electrodes in response to the force. Because of the variation in size, the combined capacitive measurements are uniform along the Y-axis. However, with the uniformity in size along the X-axis, the cumulative capacitive sensor response may not be uniform along the X-axis (615).

Figure 7:
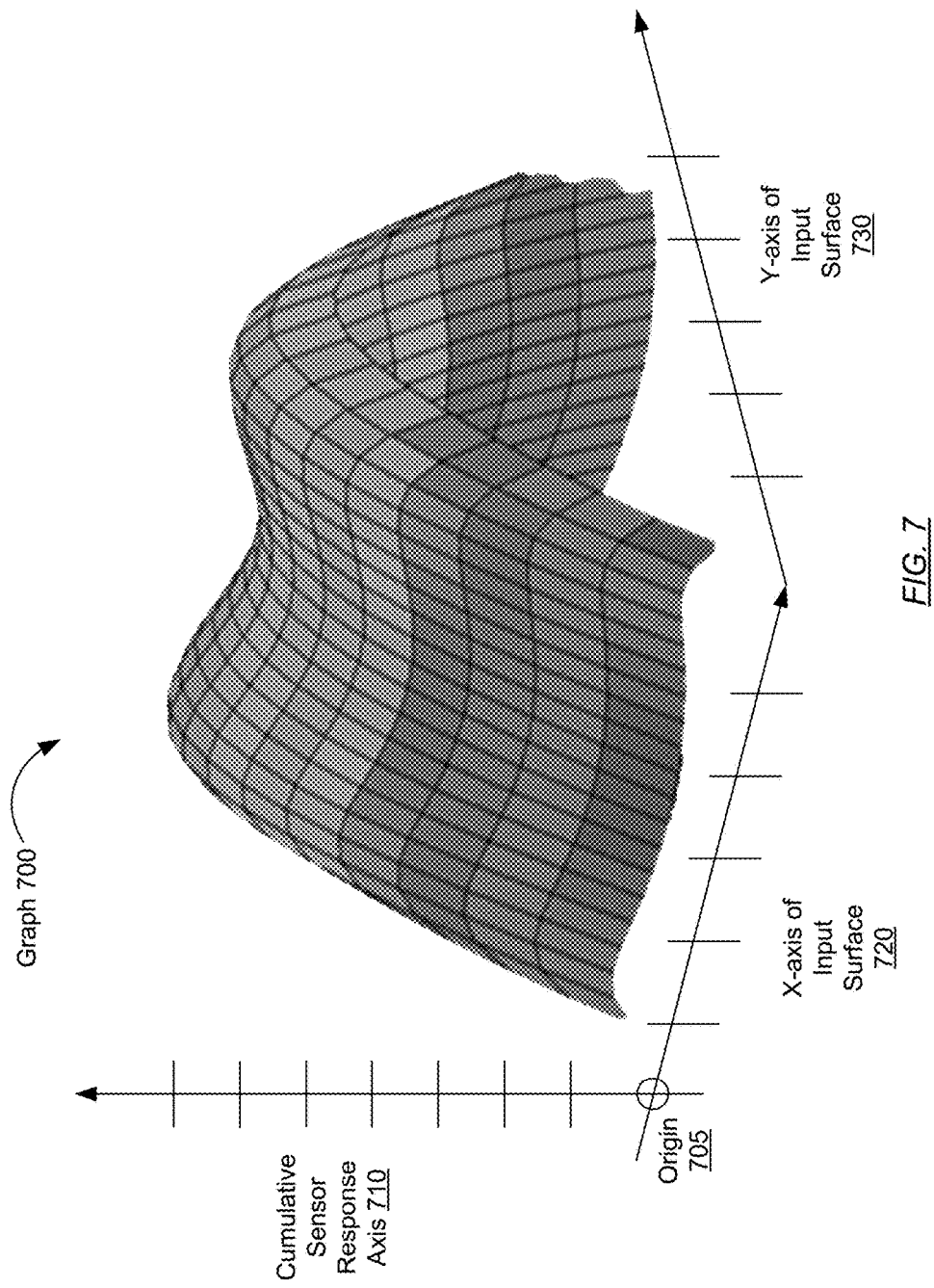
FIG. 7 shows an example graph in accordance with one or more embodiments of the invention.

FIG. 7 shows an example graph (700) of the cumulative capacitive sensor response in accordance with one or more embodiments of the invention. In FIG. 7, the X-axis (720) and the Y-axis (730) correspond to the axes of the input surface. The cumulative capacitive sensor response axis (710) shows the value of the cumulative capacitive sensor response (i.e., F(x,y)) from the force sensor electrodes. In other words, F(x,y) is the cumulative capacitive sensor response when an input object is placed at a position (x,y), where x is a value on the X-axis (720) and y is a value on the Y-axis (730) along the input surface of the input device. In particular, the graph shows the cumulative capacitive sensor responses for an input object placed with equal amount of force at different positions of the input surface. The cumulative capacitive sensor response illustrates an aggregate of capacitance measurements obtained by various force sensor electrodes in response to a force applied onto an input surface of an input device. The cumulative capacitive sensor response may correspond to a cumulative capacitive sensor response as computed by Equation 3. As shown, the cumulative capacitive sensor response shows that an input force applied along an X-axis of the input surface (720) results in a uniform cumulative capacitive sensor response (710), within a specified tolerance. As shown, the specified tolerance has a minor dip in the measurements when in the center along the X-axis. The specified tolerance may allow for manufacturing variation and wear on the input device. At the same time, a force applied at different locations along the Y-axis of the input surface (730) results in non-uniform cumulative sensor responses (710).

Figure 8:
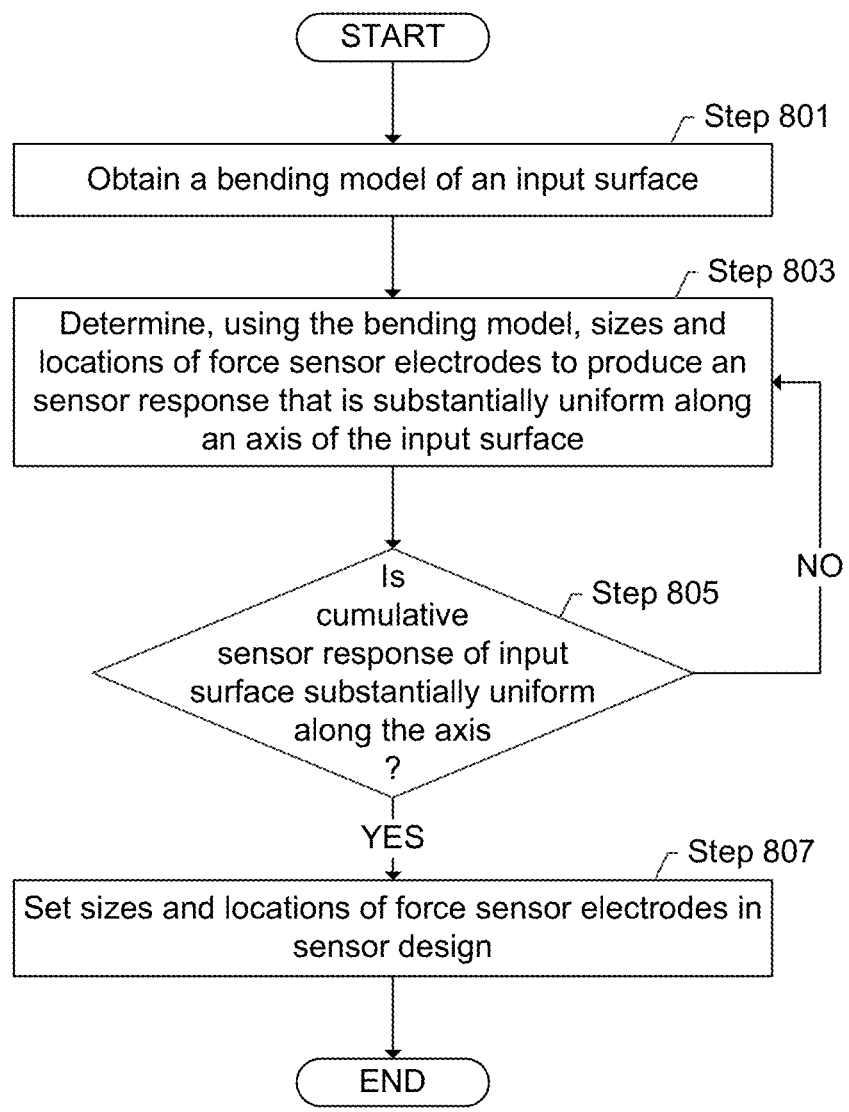
FIGS. 8, 9, and 10 show example flowcharts in accordance with one or more embodiments of the invention.
Figure 9:
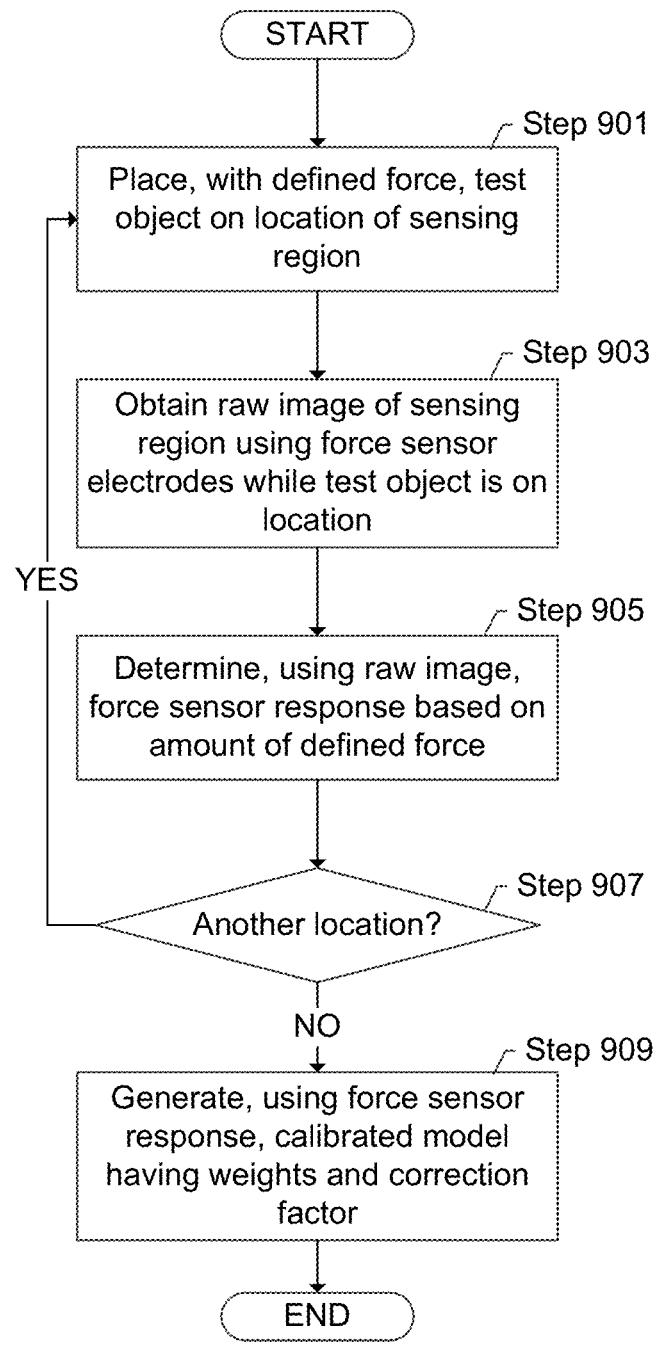
Figure 10:
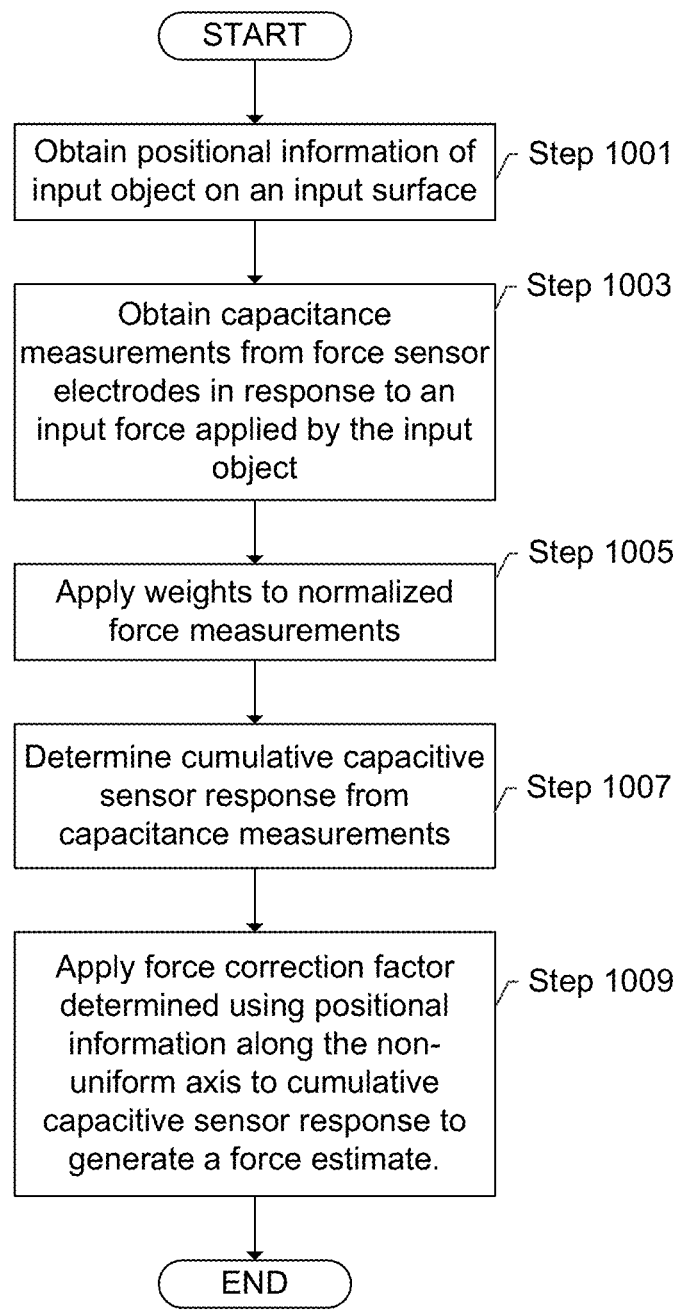

Turning to the flowcharts, FIG. 8 shows a flowchart for designing an input device having a uniform cumulative capacitive sensor response along an axis. FIG. 9 shows a flowchart for calibrating the processing system based on the design generated by the steps of FIG. 8. FIG. 10 shows a flowchart for operating the input device in accordance with one or more embodiments of the invention. Each of these flowcharts is discussed below.

While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIG. 8, FIG. 8 shows a flowchart for designing a force sensor layout in accordance with one or more embodiments of the invention. In Step 801, a bending model of an input surface is determined in accordance with one or more embodiments. In one or more embodiments, the bending model is a thin plate bending model that accounts for the attachment points substance of the compressible layer, holes in the midplane and other features. The bending model may be obtained from engineering software simulating the bend of a plate constructed from a specified material or materials based on an applied force at different locations on the plate. By way of another example, the bending model may be obtained from a third party.

In Step 803, using the bending model, sizes and locations of the force sensor electrodes are determined to produce a cumulative sensor response that is substantially uniform along an axis of the input surface. Other factors, such as size constraints, position constraints, routing constraints, electrical interference, type of capacitive sensing, processing and economical costs, and other constraints, may be considered when defining the layout of the force sensor electrodes. In general, the sizes and locations of the force sensor electrodes may be set so that the difference in sizes is proportional to the differences in the amount of bend, according to the bending model, of the input surface above the respective force sensor electrodes. Other functions may be used without departing from the scope of the invention.

In Step 805, a determination is made whether a cumulative capacitive sensor response is substantially uniform along an axis of an input device. Specifically, capacitive measurements may be obtained for a particular force sensor configuration. Computer simulations on a model input device with the layout of Step 803 may be performed to obtain the capacitive measurements. By way of another example, a prototype input device may be built according to the layout of Step 803 and used to acquire the capacitive measurements. For several locations of the sensing region, an actual or virtual input object is placed on the model or prototype with a set amount of force to identify the capacitive measurements of each force sensor electrode defined in Step 803. Equation 3 may be used to obtain the cumulative capacitive sensor response. Thus, by applying input forces to such an input device based on the particular sensor electrode configuration, the cumulative sensor response may be analyzed for each axis of the input surface of the input device. For example, a cumulative force response may be computed for a particular sensor electrode configuration as determined in Step 803 and judged for uniformity that is within the specified tolerance along the uniform axis. If the determination is made that the cumulative capacitive sensor response is not within the specified tolerance of uniformity, the flow may return to Step 803 to design/adjust a new layout. For example, sizes and/or locations of various force sensor electrodes may be adjusted to increase the uniformity of a cumulative sensor response along a particular axis of an input surface. In one or more embodiments, for example, the cumulative sensor response may be iteratively optimized until a cumulative sensor response with a substantially uniform axis is obtained for an input device.

If the cumulative capacitive sensor response is within the specified tolerance, then in Step 807, the sizes and locations of the force sensor electrodes are set. In one or more embodiments of the invention, the input device may be built according to the design.

FIG. 9 shows a flowchart for calibrating a processing system based on the sensor layout design defined in FIG. 8. The calibration may be performed for the non-uniform axis of the sensing region. In Step 901, a test object is placed on a location of the sensing region with a defined force in accordance with one or more embodiments of the invention. In other words, the test object is applied to the sensing region with a defined amount of force exerted in a defined direction on the sensing region. In one or more embodiments, the direction of the force is perpendicular to the plane of the sensing region. The amount of force is defined in that the amount of force is a fixed value. For example, a robot may exert a slug on the sensing region with a defined amount of force. By way of another example, the test object having a known weight may be placed on the sensing region, such that the force is caused by gravity of the test object. Other mechanisms may be used without departing from the scope of the invention.

In Step 903, a raw image of the sensing region is obtained while the test object is on the location in accordance with one or more embodiments of the invention. In one or more embodiments, the raw image is from absolute and/or mutual capacitive measurements of the sensing region. Absolute capacitance is determined by determining the amount of electric charge added to a force sensor electrode to increase the electric potential of the force sensor electrode by one unit. In one or more embodiments of the invention, the amount of electric potential is affected by the distance to the housing and, subsequently, the compression of the compressible layer as affected by force. To determine the absolute capacitance, the force sensor electrodes are driven with a modulated sensing signal to determine the amount of electric charge. Measurements at each force sensor electrode are obtained. For example, the measurements may be obtained at once or at different times. Mutual capacitance measurements may be obtained by transmitting a transmitter signal with a transmitter electrode (e.g., a force sensor electrode). Resulting signals are received using another force sensor electrode, which is the receiver electrode. In one or more embodiments of the invention, the resulting signals are affected by the distance between the transmitter electrode and receiver electrode and, subsequently, the compression of the compressible layer as affected by force. Regardless of whether mutual capacitive measurements or absolute capacitive measurements are used, the measurements may be combined into a raw image.

In Step 905, the force sensor response is determined based on the defined amount of force and the raw image in accordance with one or more embodiments of the invention. For example, the raw image may be normalized using the defined amount of force. If the raw image includes positional measurements (e.g., force sensor electrodes measure both touch and position), then the raw image is processed to remove the positional information. Further processing may be performed to account for background capacitance, such as noise. A cumulative capacitive sensor response is determined for each location along a non-uniform axis of an input surface in accordance with one or more embodiments. For example, the cumulative capacitive sensor response may correspond to the sum of the post processed force measurements among the force sensor electrodes of the input device.

In Step 907, a determination is made whether another location exists to place the test object. In particular, a determination is made whether to move the test input object to a new location along the non-uniform axis and obtain additional calibration data. In one or more embodiments, the number of positions is dependent on the amount of acceptable error as well as the amount of storage for data. In particular, each position results in storage of calibration data as well as a reduction in error for determining force. The positions and number of positions may be predefined as configuration parameters based on the storage and error requirements. If a determination is made to use another location, the process repeats starting with Step 901.

Continuing with FIG. 9, in Step 909, using the force sensor response, a calibrated model having weights and a correction factor are generated. The weights may be applied to each force sensor electrode per Equation 3 discussed above and account for the position of the input object. In other words, the weight applied to the capacitive measurement for a force sensor electrode accounts for the different capacitive sensor responses at the force sensor electrode based on the varying amount of deflection without a corresponding size variance. The weights may be normalized such that the sum of the weights is a predefined number (e.g., one). The correction factor is value applied to the cumulative capacitive sensor response. The correction factor is defined at least in part by the location of the input object along the non-uniform axis. The correction factor accounts for the possibility that the amount of bend of the entire input surface, and corresponding cumulative capacitive sensor response of the entire input surface is different depending on the position of the input object in the sensing region. For example, when an input object is placed at the side of the sensing region, less total bend of the input surface may exist for an equal amount of force than when the input object is placed in the center of the sensing region. Thus, each location along the non-uniform axis has corresponding weights and a correction factor in accordance with one or more embodiments of the invention.

Turning to FIG. 10, FIG. 10 shows a flowchart an input device having a cumulative capacitive sensor response in accordance with one or more embodiments of the invention. In Step 1001, positional information of an input object is obtained for an input object. In particular, the positional or touch sensor electrodes may operate according to a sensing technology (e.g., absolute or mutual capacitive, or other sensing technology) to obtain positional measurements. The positional measurements may be processed to identify the position of the input object on the input surface. In other words, the position along the axes is determined from the processing.

In Step 1003, capacitance measurements are obtained from the force sensor electrodes in response to an input force applied by the input object in accordance with one or more embodiments of the invention. Obtaining the capacitive measurements may be performed as discussed above with respect to Step 903 of FIG. 9. Further, in some embodiments, obtaining the capacitive force measurements may be performed at the same time as obtaining the positional measurements, such as using the same electrodes. Thus, the raw image may include both capacitive force information and positional information. In such a scenario, the raw image may be processed to obtain a force image having only force measurements. Further processing may be performed to account for background noise, and to remove erroneous data.

In Step 1005, the weights are applied to the normalized force measurements in accordance with one or more embodiments of the invention. Based on the positional information along the non-uniform axis, the set of weights determined in FIG. 9 are obtained from storage. The weights may be pre-determined and independent of positional information, or may depend on positional information of the input object. In one or more embodiments, the weights are obtained and used for all electrodes regardless of the axis. Each capacitive force measurement is multiplied by the respective weight to obtain revised capacitive measurements.

In Step 1007, a cumulative capacitive sensor response is determined from the revised capacitive measurements. In one or more embodiments, the above equations may be used to determine the cumulative capacitive sensor response.

In Step 1009, force information is determined using the cumulative capacitive sensor response in accordance with one or more embodiments of the invention. In one or more embodiments, the corrective factor matching the position of the input object along the non-uniform axis is obtained. The cumulative capacitive sensor response may be multiplied by the correction factor to obtain a corrected cumulative capacitive sensor response. The correction factor may be based, for instance, on a table lookup or a formula such as a cubic interpolation between calibrated positions on the input surface. The corrected cumulative capacitive sensor response may be translated into a force value defining the amount of force of the input object.

For example, the processing system may determine a force estimate at a location by calculating a sum of ratios affected by the change in capacitive coupling for force electrodes multiplied by weights for the force electrodes. In some embodiments, the correction factor is identified by using a function based on the location of the input object along the non-uniform axis, or based on a look-up table correlating the location of the input object along the non-uniform axis with correction factors. As another example, the processing system may estimate a force magnitude using the capacitance measurements, and apply a correction factor to the cumulative sensor response or an initial force estimate.

In one or more embodiments of the invention, the force may be reported to a central processor of the input device. The central processor or processing system may use the force as user input requesting an action to be performed by the input device. For example, the input may be to select an item in the graphical user interface, open or close an application, provide further information, or performed another action.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
an input surface having a first axis and a second axis, the input surface having a non-uniform bending response when a force is applied; and
a plurality of force sensor electrodes, the plurality of force sensor electrodes having a cumulative capacitive sensor response to the force on the input surface,
wherein deflections of the plurality of force sensor electrodes in response to the force are non-uniform due to the non-uniform bending response of the input surface,
wherein the cumulative capacitive sensor response is, within a specified tolerance, uniform along the first axis based on a plurality of sizes of the plurality of force sensor electrodes,
wherein the cumulative capacitive sensor response is a weighted sum of a plurality of force measurements obtained from the plurality of force sensor electrodes along the first axis, the weighted sum being independent from a positional coordinate of the force being applied with respect to the first axis, and
wherein the independency from the positional coordinate results from a first subset of the plurality of force sensor electrodes being of heterogeneous sizes to compensate for the non-uniform deflections.

2. The input device of claim 1, further comprising:
sensor circuitry configured to acquire the plurality of force measurements by modulating the plurality of force sensor electrodes; and
a processing system configured to determine the force on the input surface using the plurality of force measurements.

3. The input device of claim 2, further comprising:
a plurality of positional sensor electrodes,
wherein the sensor circuitry is further configured to acquire a plurality of positional measurements by modulating the plurality of positional sensor electrodes, and
wherein the processing circuitry is further configured to:
determine a position of an input object along the second axis using the plurality of positional measurements,
wherein determining the force is based on the position.

4. The input device of claim 1, wherein the plurality of force sensor electrodes comprises a plurality of transmitter electrodes and a plurality of receiver electrodes, wherein the plurality of receiver electrodes is of heterogeneous sizes to achieve the cumulative capacitive sensor response that is uniform.

5. The input device of claim 1, wherein the plurality of sizes of the plurality of force sensor electrodes monotonically increase from a center of the input surface along the first axis.

6. An input device comprising:
an input surface having a first axis, a second axis substantially orthogonal to the first axis, and a corner, the input surface having a non-uniform bending response when a force is applied; and
a plurality of force sensor electrodes, the plurality of force sensor electrodes comprising:
a first sensor electrode adjacent to the corner, and
a second sensor electrode located farther from the corner along the first axis than the first sensor electrode, the second sensor electrode being smaller than the first sensor electrode,
wherein a deflection of the first sensor electrode in response to the force is different from a deflection of the second sensor electrode, due to the non-uniform bending response of the input surface, and
wherein sizes of the first and second sensor electrodes are selected to obtain a uniform cumulative capacitive sensor response in presence of the non-uniform deflections,
wherein the cumulative capacitive sensor response is a weighted sum of force measurements obtained from at least the first and the second sensor electrodes along the first axis, the weighted sum being independent from a positional coordinate of the force being applied with respect to the first axis, and
wherein the independency from the positional coordinate results from the first and the second sensor electrodes being of heterogeneous sizes to compensate for the non-uniform deflections.

7. The input device of claim 6, wherein the first axis is shorter than the second axis.

8. The input device of claim 6, wherein the plurality of force sensor electrodes comprises a plurality of transmitter electrodes and a plurality of receiver electrodes, wherein the plurality of receiver electrodes comprises the first sensor electrode and the second sensor electrode.

9. The input device of claim 6, further comprising:
sensor circuitry configured to acquire a plurality of force measurements by modulating the plurality of force sensor electrodes; and
a processing system configured to determine the force on the input surface using the plurality of force measurements.

10. The input device of claim 9, further comprising:
a plurality of positional sensor electrodes,
wherein the sensor circuitry is further configured to acquire a plurality of positional measurements by modulating the plurality of positional sensor electrodes;
wherein the processing circuitry is further configured to:
determine a position of an input object along the second axis using the plurality of positional measurements,
wherein determining the force is based on the position.

11. The input device of claim 6, further comprising:
a display, wherein the plurality of force sensor electrodes comprise a plurality of in-cell sensor electrodes located in the display.

12. A processing system for an input device, the processing system comprising:
sensor circuitry configured to be coupled to a plurality of positional sensor electrodes, and a plurality of force sensor electrodes, the sensor circuitry configured to:
obtain a plurality of force measurements from the plurality of force sensor electrodes, wherein deflections of the plurality of force sensor electrodes in response to a force being applied to an input surface of the input device are non-uniform due to a non-uniform bending response of the input surface, and obtain a plurality of positional measurements from the plurality of positional sensor electrodes, wherein the plurality of force sensor electrodes has a cumulative capacitive sensor response that is substantially uniform along a first axis of the input surface, wherein the cumulative capacitive sensor response is a weighted sum of the plurality of force measurements along the first axis, the weighted sum being independent from a positional coordinate of the force being applied with respect to the first axis, and wherein the independency from the positional coordinate results from a first subset of the plurality of force sensor electrodes being of heterogeneous sizes to compensate for the non-uniform deflections; and a processing circuitry configured to:
determine, using the plurality of force measurements, the cumulative capacitive sensor response, and
determine, using the cumulative capacitive sensor response, force information.

13. The processing system of claim 12, wherein the cumulative capacitive sensor response varies along a second axis of the input surface.

14. The processing system of claim 13, wherein the force information is determined using the plurality of positional measurements along the second axis.

15. The processing system of claim 13,
wherein determining the force information comprises:
determining the force information using a positional coordinate of at least one input object with respect to the second axis, and
ignoring a positional coordinate of the at least one input object with respect to the first axis.

16. The processing system of claim 12, wherein obtaining the plurality of force measurements from the plurality of force sensor electrodes comprises modulating the plurality of force sensor electrodes with respect to a reference voltage.

17. The processing system of claim 12, wherein obtaining the plurality of force measurements from the plurality of force sensor electrodes comprises:
transmitting a plurality of transmitter signals using a second subset of the plurality of force sensor electrodes, and
receiving a plurality of resulting signals using the first subset of the plurality of force sensor electrodes.

18. The processing system of claim 17, wherein the heterogeneous sizes of the first subset monotonically increase from a center of an input surface along the first axis.

* * * * *